Figure 1:
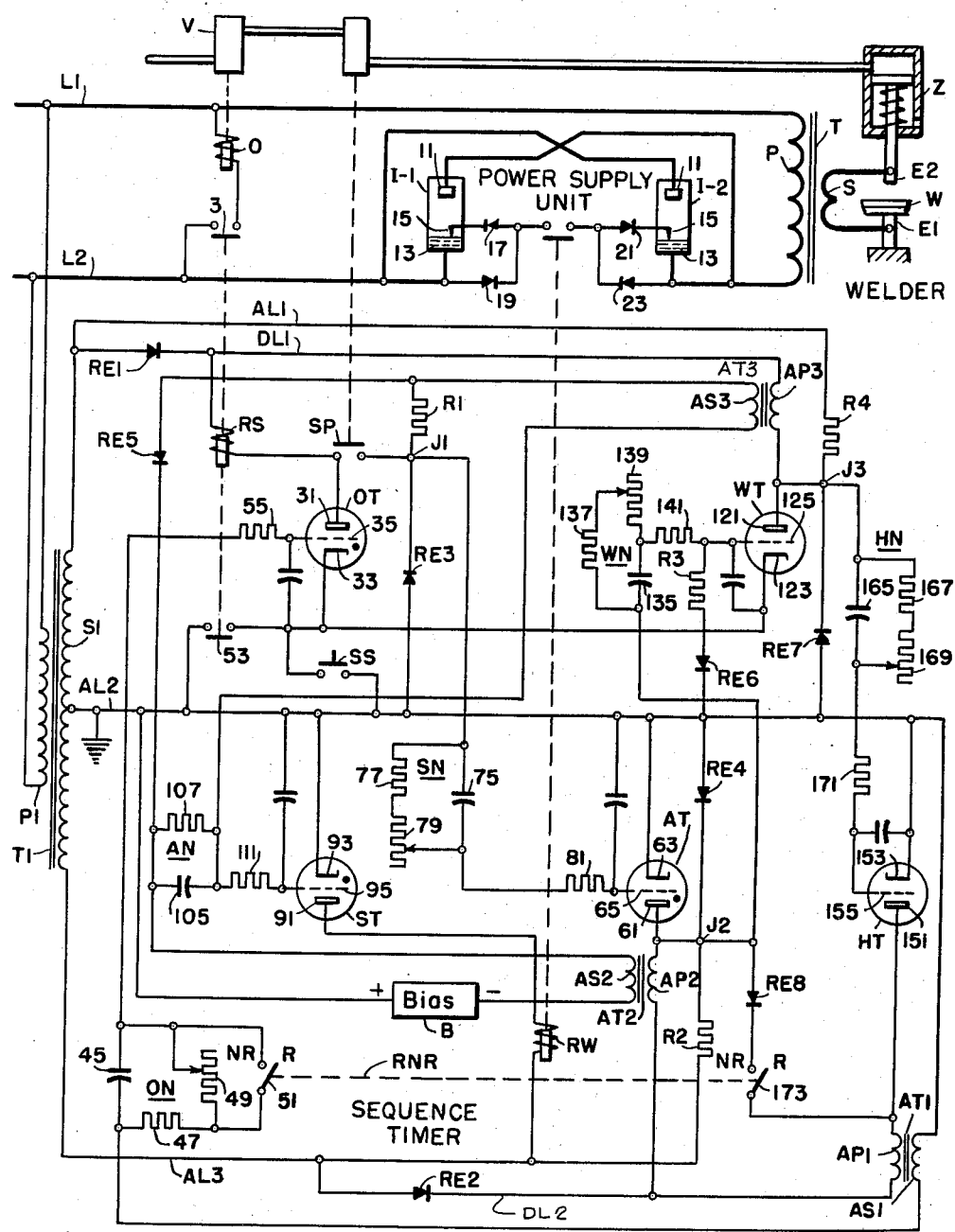

July 29, 1958

H. W. VAN NESS 2,845,531

ELECTRIC DISCHARGE APPARATUS

Filed April 19, 1954

2 Sheets-Sheet 2

United States Patent Office 2,845,531
Patented July 29, 1958

2,845,531

ELECTRIC DISCHARGE APPARATUS

Hubert W. Van Ness, East Aurora, N. Y., assignor to Westinghouse Electric Corporation, East Pittsburgh, Pa., a corporation of Pennsylvania Application April 19, 1954, Serial No. 424,094

16 Claims. (Cl. 250—27)

My invention relates to electric discharge apparatus and has particular relation to timing apparatus for controlling a sequence of operations, such as that involved in resistance welding.

My invention is an outgrowth of my work on the invention disclosed in application Serial No. 378,546, filed September 4, 1953, to Edward C. Hartwig (hereinafter called Hartwig application). My invention also relates to application Serial No. 378,446, filed September 4, 1953, to Edward C. Hartwig and Hubert W. Van Ness, and an application Serial No. 378,444, now Patent No. 2,748,343, filed September 4, 1953, to Edward C. Hartwig and Hubert W. Van Ness. The above-mentioned three applications are incorporated in this application by reference.

It is a specific object of my invention to provide a sequence timer, of the general structure disclosed in the Hartwig application, which shall be of simpler structure and shall lend itself to manufacture and sale at a lower cost than the apparatus disclosed in the Hartwig application.

Another object of my invention is to provide a novel electronic circuit.

A further object of my invention is to provide a novel circuit for controlling the conductivity of a discharge device in response to a pair of independent signals.

My invention in its specific aspects involves a sequence timer such as the timer used in resistance welding, which includes circuit components for timing a squeeze interval, a weld interval, a hold interval and an off interval and particularly the cooperative relationship between the squeeze and weld components of such a timer. These components require particular consideration because of the unusual manner in which they operate. During a welding operation, a signal is produced by rendering conducting a discharge device to initiate the squeeze timing component. After the squeeze timing component has timed out, it is actuated to start the operation of the weld timing component and the welding current flows to the work. At the end of the weld interval, the welding current stops flowing, but during a succeeding hold interval, the welding electrodes remain in engagement with the work so that the welded mass may solidify; that is, the part of the squeeze component which is actuated to start the welding current must at the beginning of the hold time be actuated to stop it. This object cannot be accomplished by causing the sequence timer to back track; for example, by rendering non-conducting the discharge device which produced the initial signal, because the parts which actuated the squeeze component to time out are involved in the operation of the latter timing components of the timer. It is necessary that the squeeze timing component be reverted to its initial condition by an additional signal which produced the desired effect independently of the signal which started the timing of this squeeze timing component. My invention in its specific aspects is addressed to this necessity.

In accordance with the specific aspects of my invention, I provide a sequence timer in which the squeeze timing component is controlled by an electric discharge device, in the control circuit of which a plurality of potentials are impressed in sequence. One of these potentials is a biasing potential which maintains the discharge device non-conducting in the quiescent state of the apparatus. A second potential is impressed when the squeeze component times out. This second potential is capable of counteracting the biasing potential and rendering the discharge device conducting. A third potential is impressed at the beginning of the hold time. This potential is capable of counteracting the second potential and of again rendering the discharge device non-conducting.

The sequence timer disclosed in the Hartwig application includes a number of rectifiers. An additional feature of the sequence timer according to my invention is that in it, the number of rectifiers interconnecting the various electrical components is minimized. Still another feature of my invention is the inclusion in my sequence timer of means for synchronizing the operation of the discharge device which starts the operation with the supply from which the welding current is derived.

The novel features that I consider characteristic of my invention are set forth generally above. My invention, itself, both as to its organization and method of operation, together with additional objects and advantages thereof, will be understood from the following description of specific embodiments when read in connection with the accompanying drawings; in which, Figure 1 is a circuit diagram of a preferred embodiment of my invention; and Fig. 2 is a fragmentary circuit diagram showing a modification of my invention.

Figure 2:
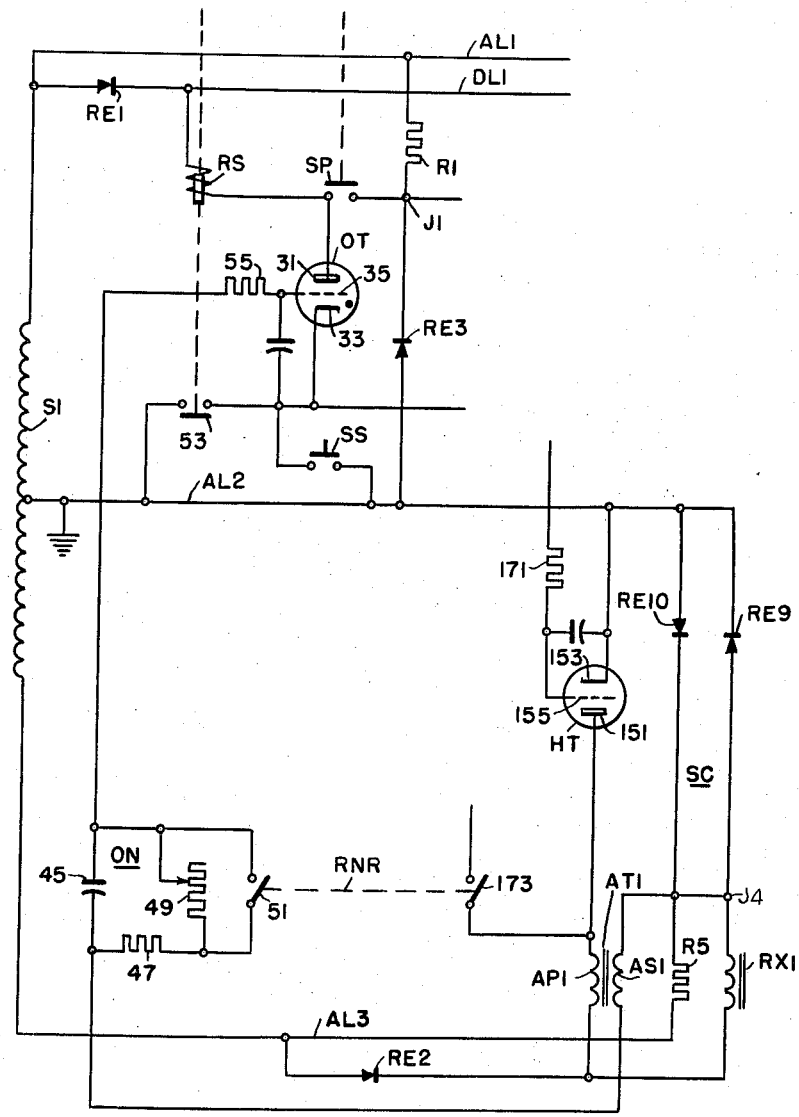

*Description—Figure 1*

In Figure 1, my invention is shown as incorporated in resistance welding apparatus. This apparatus includes a welder, a power supply unit, and a sequence timer. The apparatus is supplied from a pair of supply conductors L1 and L2 which may derive their power from the usual commercial source of 220, 440, 550 volts or other higher voltages. For supplying the sequence timer, auxiliary buses or conductors AL1, AL2, and AL3, and DL1 and DL2 are provided. These conductors are energized from a transformer T1 having a primary P1 and a secondary S1. The primary P1 is supplied from the conductors L1 and L2. The secondary S1 has an intermediate tap which is preferably grounded to the metal cabinet or container (not shown) in which the apparatus is mounted. The conductor AL1 is connected to one terminal tap of the secondary S1; the conductor AL3 to the other terminal tap; and the conductor AL2 to the intermediate tap. The conductor DL1 is connected to the conductor AL1 through a rectifier RE1 which is poled to conduct positive current from conductor AL1 to conductor DL1. By positive current, I mean the flow of positive ions or holes as distinct from electrons. The conductor DL2 is connected to the conductor AL3 through another rectifier RE2 poled to conduct positive current from the conductor AL3 to the conductor DL2.

The welder includes a fixed electrode E1 and a movable electrode E2 adapted to engage work W. The movable electrode E2 is movable under fluid pressure built up in a cylinder Z. The flow of pressure to the cylinder Z is controlled by a valve V, which is actuable by a solenoid O supplied from the conductors L1 and L2 through a contact 3 of a starting relay RS actuable by the sequence timer. A back pressure switch mechanism is connected in the fluid supply line to the cylinder Z, and this switch is actuated to close a contact SP in the sequence timer when adequate pressure is built up between the electrodes E1 and E2 and the work W.

The welder also includes a welding transformer T having a primary P and a secondary S. The secondary S is connected between the electrodes E1 and E2, and when power is supplied to the primary P, current flows through the secondary S, the electrodes E1 and E2, and the work W.

The power supply unit is an electronic contactor of the usual type including a pair of ignitrons I–1 and I–2, each ignitron having an anode 11, a cathode 13, and an ignitor 15. Each ignitor 15 is connected to its associated cathode 13 through a pair of rectifiers 17 and 19 and 21 and 23 poled to conduct positive current externally to the ignitrons I–1 and I–2 from the cathodes 13 to the ignitors 15. The junctions of the rectifier pairs are adapted to be interconnected by a normally open contact 31 of a relay RW of the sequence timer. The anodes 11 and cathodes 13 of the ignitrons I–1 and I–2 are connected in inverse parallel between the conductors L1 and L2 and the primary P.

The sequence timer includes a plurality of thyratrons; an off thyratron OT, a squeeze thyratron ST, a weld thyratron WT, and a hold thyratron HT, for initiating the off squeeze weld and hold intervals of a welding process. The sequence timer also includes a plurality of timing networks; the off network ON, the squeeze network SN, the weld network WN, and the hold network HN for timing the various intervals. The sequence timer further includes an auxiliary thyratron AT and an auxiliary network AN.

The off thyratron OT includes an anode 31, a cathode 33, and a control electrode 35. The off network ON includes a capacitor 45 shunted by a fixed resistor 47 and a variable resistor 49. The variable resistor may be shunted out by a contact 51 of the repeat-non-repeat switch RNR in the non-repeat position. The anode 31 is connected to the conductor DL1 through the coil of the relay RS. The cathode 33 is adapted to be connected to the conductor AL2 through the start switch SS of the apparatus which may be, and usually is, a foot switch, and alternatively through a normal open contact 53 of the relay RS, which when closed locks out the switch SS so that the apparatus operates non-beat. The control electrode 35 of the thyratron OT is connected to the conductor AL2 through a grid resistor 55, the network ON, and the secondary AS1 of the transformer AT1 having a primary AP1. A resistor R1 and a rectifier RE3 are associated with thyratron OT. The resistor R1 is adapted to be connected between the conductor AL1 and the anode 31 of the thyratron OT through the back pressure switch SP. The rectifier RE3 is adapted to be connected between the conductor AL2 and the anode of the thyratron OT through the switch SP. The rectifier RE3 is poled to conduct positive current from the conductor AL2 to the anode. The purpose of the resistor R1 and the rectifier RE3 is explained in the Hartwig application.

The auxiliary thyratron AT has an anode 61, a cathode 63, and a control electrode 65. The squeeze network consists of a capacitor 75 shunted by a fixed resistor 77 and a variable resistor 79. The anode 61 is connected to the conductor DL2 through the primary AP2 of the transformer AT2. The cathode 63 is connected to the conductor AL2. The control electrode 65 of the thyratron AT is connected to the junction J1 of the resistor R1 and the rectifier RE3 associated with thyratron OT through a grid resistor 81 and the squeeze network SN. A resistor R2 is connected between the conductor AL3 and the anode 61 of the thyratron AT. A rectifier RE4 is connected between the conductor AL2 and the anode 61 of thyratron AT. This rectifier RE4 is poled to conduct positive current from the conductor AL2 to the anode.

The squeeze thyratron ST has an anode 91, a cathode 93 and a control electrode 95. The network AN has a capacitor 105 shunted by a resistor 107. The anode 91 is connected to the conductor AL3 through the exciting coil of the relay RW. The cathode 93 is connected to the conductor AL2. The control electrode 95 is connected to the conductor AL2 through a grid resistor 111, the network AN, the secondary AS2, and a bias B. The secondary AS3 of a transformer AT3 is connected across the network AN through a rectifier RE5. The bias B is poled and has a magnitude, such as to maintain the thyratron ST non-conducting in the quiescent condition of the apparatus.

The thyratron WT includes an anode 121, a cathode 123, and a control electrode 125. The network WN includes a capacitor 135 shunted by a fixed resistor 137 and a variable resistor 139. The anode 121 of the thyratron WT is connected to conductor DL1 through the primary AP3 of transformer AT3. The cathode 123 is adapted to be connected to the conductor AL2 through the starting switch SS or alternatively through the normally open contact 53 of the relay RS. The control electrode 125 is connected to the junction J2 of the rectifier RE4 and resistor R2 associated with the thyratron AT through a grid resistor 141 and the weld network WN. Between the control electrode 125 and the conductor AL2, a resistor R3 and a rectifier RE6 are connected in series. The rectifier RE6 is poled to conduct current from the control electrode 125 to the cathode 123. The rectifier RE6 provides for charging the network WN in the quiescent condition of the apparatus and prevents false firing of the thyratron WT on the initial closing of the start switch SS.

Another resistor R4 is connected between the conductor AL1 and the anode 121 of the thyratron WT. A rectifier RE7 is connected between the conductor AL2 and the anode 121 of the thyratron WT. The rectifier RE7 is poled to conduct positive current from the conductor AL2 to the anode 121.

The thyratron HT has an anode 151, a cathode 153, and a control electrode 155. The network HN has a capacitor 165 shunted by a fixed resistor 167 and a variable resistor 169. The anode 151 is connected to the conductor DL2 through the primary AP1 of the transformer AT1. The cathode 153 is connected to the conductor AL2. The control electrode 155 is connected through a grid resistor 171 and through the network HN to the junction J3 of the resistor R4 and the rectifier RE7 associated with the thyratron WT. The anode 151 of the thyratron HT is also adapted to be connected to the conductor DL2 through a contact 173 of the repeat-non-repeat switch RNR when the latter is in the non-repeat position, another rectifier RE8, and the primary AP2 of the transformer AT2.

As is the case with the corresponding apparatus disclosed in the Hartwig application, the impedance in the anode circuits of the thyratrons OT, AT, ST, HT, and WT, has sufficient inductance to insure that once one of these thyratrons becomes conducting during a positive half period of anode-cathode potential, it continues to conduct to a substantial extent during the succeeding negative half period sufficiently to assure that the thyratron which it controls is rendered conducting early in this succeeding half period.

The rectifier RE1 between the conductor AL1 and the conductor DL1 blocks the flow of current through the primary AP3 when the polarity of the potential between the conductors AL1 and AL2 is such that the rectifier RE7 associated with thyratron WT is conducting. This blocking effect prevents alternating current from flowing through primary AP3 and an introduction of phase shift in the anode potential of the thyratron WT. The rectifier RE2 between the conductors AL3 and DL2 performs a similar function with respect to the primary AP2.

*Stand-by—Figure 1*

The stand-by condition of the apparatus will now be described with the switch RNR in the repeat position.

In the stand-by condition of the apparatus, the circuit breakers or other main switching equipment (not shown) for the apparatus is closed. The cathodes 33, 63, 93, 123, and 153 of the thyratrons OT, AT, ST, WT and HT are heated, and the thyratrons are capable of conducting. But, the switch SS is open, and the thyratron OT is non-conducting so that the relay RS is deenergized and its contacts 3 and 53 are open. Because contact 3 is open, solenoid O is deenergized and electrode E2 is retracted from electrode E1. Back pressure switch SP is also open.

In the quiescent condition of the apparatus with switch SP open, junction J1 is highly positive during the half periods when conductor AL1 is positive and during these half periods, the network SN is charged in a circuit from the conductor AL1 through the resistor R1, the network SN, the grid resistor 81 of thyratron AT, the control electrode 65 and cathode 63 of thyratron AT, to the conductor AL2. This charge is such as to maintain the control electrode 65 negative with respect to cathode 63, and thyratron AT is maintained non-conducting during the succeeding half periods. There is then no current flow through the primary AP2, and transformer AT2 is quiescent. Thyratron WT is also maintained non-conducting at the open switch SS, and transformer AT3 is also quiescent. Since transformers AT2 and AT3 are quiescent, the only potential impressed in the control circuit of thyratron ST is the bias B, and thyratron ST is maintained non-conducting. Relay RW is then deenergized and its contact 31 is open so that the ignitrons I-1 and I-2 are deenergized.

In addition, during the half periods when conductor AL3 is positive relative to conductor AL2, the network WN is charged in a circuit extending from conductor AL3 through the resistor R2 associated with thyratron AT, the network WN, the grid resistor 141, the resistor R3 and the rectifier RE6 connected to the control electrode 125 of thyratron WT to the conductor AL2. The spurious conduction of thyratron WT is prevented by the charge on the network WN. The resistor R3 and back resistance of rectifier RE6 provide a path through which the capacitor 135 may discharge if switch SS or contact 53 are closed. The resistor R3 should then be so dimensioned as not to affect the timing of capacitor 135.

The control electrode 155 of thyratron HT is connected to the conductor AL1 through the resistor R4 and its potential is thus in opposite phase to the anode potential. Network HN is thus charged from the conductor AL1 in a circuit extending from the conductor AL1 through the resistor R4, the network HN, grid resistor 17, the control electrode 155 and cathode 153 of thyratron HT to the conductor AL2. Thyratron HT is maintained non-conducting by the charge on network HN, and transformer AT1 is quiescent so that there is no blocking potential on network ON, and thyratron OT is ready to conduct once its anode circuit is closed.

*Operation—Figure 1*

When a weld or a series of welds are to be produced, the work W is disposed on electrode E1 in the proper position, and the switch SS is closed by the operator. Thyratron OT then immediately conducts, actuating the relay RS and the contacts 3 and 53 of the relay RS then close. The switch SS is locked out at the contact 53 and the circuit through the solenoid O is closed at the other, so that the solenoid is actuated and the valve V is opened to cause the electrode E2 to engage the work W under pressure. After the electrode E2 is properly seated on the work, pressure is built up between electrodes E1 and E2 and the work W, and when this pressure has reached an adequate value, the back pressure switch SP is closed. While the above events are taking place, thyratron OT is conducting. When the switch SP is closed, the charging potential is shunted away from the network SN, and the latter discharges to time the squeeze interval. When the network SN has been discharged sufficiently to end the squeeze interval, the thyratron AT is rendered conducting, causing current to flow through the primary AP2. The secondary AS2 is so connected and so wound that the resulting potential impressed in the control circuit of thyratron ST is sufficient to counteract the bias B and thyratron ST is rendered conducting. Relay RW is now actuated, closing the firing circuits through the ignitrons I-1 and I-2, and the latter are rendered conducting, each in its turn, to supply alternating current through primary P of the welding transformer T. Current now flows through secondary S to weld the work W.

When thyratron AT is rendered conducting, it diverts the charging potential from the network WN, and the latter begins to discharge to time out the weld interval. When the network WN has discharged sufficiently, the thyratron WT is rendered conducting, supplying current to the primary of the transformer AT3. The secondary AS3 of this transformer is so wound and so connected in the control circuit of thyratron ST that it impresses a charge on network AN which counteracts the effect of the potential of secondary AS2, so that thyratron ST is again rendered non-conducting in spite of the fact that the operation of the apparatus requires that the thyratron AT continues to conduct.

When thyratron ST becomes non-conducting, relay RW is deenergized, and the firing circuits for the ignitrons I-1 and I-2 are opened. The supply of current through the primary P is then interrupted, and the supply of welding current through the electrodes E1 and E2 is discontinued. But the electrodes remain in engagement with the work W under pressure because thyratron OT is still conducting and relay RS is still energized.

When thyratron WT is rendered conducting, it diverts the charging current from the network HN, and the latter begins to discharge to time out the hold time. When the network HN has discharged sufficiently, the thyratron HT is rendered conducting, causing current to flow through the primary AP1 of the transformer AT1. Potential is then induced in the secondary AS1 of the transformer AT1 to impress a blocking bias on the thyratron OT, and the latter is rendered non-conducting. Relay RS is then deenergized, opening the circuit through the solenoid O. The valve V is then closed, and the electrode E2 is permitted to recede from the work W. At the same time, the pressure switch SP is also opened. At the contact 53 of the relay RS, the circuit between the cathode and the conductor AL2 is also opened.

When the thyratron OT is rendered non-conducting, the connection of the control electrode 65 of thyratron AT to the conductor AL1 through the resistor R1 becomes effective, network SN is reset, and thyratron AT is rendered non-conducting. The Thyratron AT thus may become non-conducting during the half period following the one during which thyratron OT passed non-conducting. With thyratron AT non-conducting, the supply of the counteracting potential through the secondary AS2 is discontinued, but this does not affect thyratron ST which is already non-conducting and remains so. In addition, the connection of the junction J2 to the conductor AL3 becomes effective and thyratron WT is rendered non-conducting and network WN is reset. Thyratron WT becomes non-conductive during the positive half period of AL1—AL2 following the one during which thyratron OT became non-conducting. When thyratron WT becomes non-conducting, the connection of the junction J3 to conductor AL1 becomes effective and thyratron HT is rendered non-conducting and network HN is reset. Thyratron HT is rendered non-conducting during the half period following the one during which thyratron WT was rendered non-conducting. Now the current flow through the secondary AS1 is interrupted, and thus the charging of the network ON is stopped. If the switches SS now remains closed, another operation may be started, but before this operation can start, the network ON must discharge to time the off time. During this time, the work may be moved so that a second weld may be produced.

With the repeat-non-repeat switch RNR in the non-repeat position, thyratron HT, once rendered conducting through RE8 prevents network WN from being reset. Under the circumstances, thyratron WT remains conducting, network HN remains discharged, thyratron HT remains conducting, and thyratron ST remains non-conducting so long as switch SS remains closed. To initiate another operation, switch SS must be opened. When switch SS is opened, thyratron WT becomes non-conducting, rendering thyratron HT non-conducting and permitting thyratron OT to conduct when switch SS is again reclosed.

*Figure 2—Modification*

The Figure 2 modification differs from the Figure 1 modification only in that it includes the starting circuit SC. This circuit assures that once the starting switch SS is closed, the thyratron OT is rendered conducting at the beginning of a positive half period of the supply, and not at any intermediate instant in the half period.

The starting circuit SC includes a rectifier RE9 and an inductive reactance RX1 connected in series between the conductor DL2 and the conductor AL2, with the reactance RX1 connected to the conductor DL2 and the rectifier RE9 connected to the conductor AL2, and the rectifier RE9 poled to conduct positive current from conductor DL2 to the conductor AL2. The circuit SC also includes a second rectifier RE10 and a resistor R5 which are connected in series between the conductors AL3 and AL2. The resistor R5 is connected to conductor AL3, and the rectifier RE10 is connected to conductor AL2, and the rectifier RE10 is poled to conduct positive current from the conductor AL2 to conductor AL3. The junction J4 of the last-mentioned resistor R5 and rectifier RE10 is connected to the junction of the rectifier RE9 and reactance RX1 and also through the secondary AS1 of the transformer AT1, and the network ON to the control electrode 35 of the thyratron OT.

When the apparatus shown in Fig. 2 is in the stand-by condition, its thyratrons, including thyratrons OT and HT, are non-conducting in the same way as the thyratrons of the Fig. 1 modification. During the half periods when conductor AL3 is positive relative to conductor AL2, current flows through reactor RX1 and rectifier RE9. Because of the reactive effect of reactor RX1, this current continues to flow during the early part of the succeeding half periods, when the anode 31 of thyratron OT is positive relative to conductor AL2, producing a positive potential drop equal to the drop across rectifier RE9 between the junction J4 and conductor AL2. While current is still flowing through reactor RX1 and rectifier RE9, current flow through rectifier RE10 is blocked because junction J4 is positive relative to conductor AL2 and positive drop across rectifier RE9 is impressed between the control electrode 35 and conductor AL2. At this time, network ON is uncharged so that when switch SS is closed during the early part of any half period during which anode 31 is positive relative to conductor AL2, thyratron OT conducts at the beginning of this half period. Later in the same half period when the flow of current through reactor RX1 and RE9 has stopped, current flows through rectifier RE10 and resistor R5 and the small drop across rectifier RE10 is impressed between control electrode 35 and conductor AL2 and appears as a blocking potential between electrode 35 and cathode 33 when switch SS is closed, thus at this time preventing the conduction of thyratron OT. Thyratron OT can then start conducting only at the beginning of a half period when the anode 31 is positive relative to conductor AL2, and its operation is synchronized and the operation of the sequence timer is highly positive.

In other respects, the timer operates similarly to the one shown in Fig. 1.

*Conclusion*

I have disclosed in this application apparatus of comparatively simple and low cost structure for timing the operations of a welding process or any similar process. While this invention has been disclosed as incorporated in certain specific embodiments herein, many modifications thereof are possible. Thus, while thyratrons shown are described herein for triggering the various timing operations other discharge devices such as transistor, for example, could be used in accordance with the broader aspects of my invention and the expression "electric discharge device" in the claims is intended to cover devices other than thyratrons to the extent that my invention in its broader aspects comprehends within its scope the use of such devices. My invention then is not to be restricted, except insofar as is necessitated by the spirit of the prior art.

I claim as my invention:

1. In combination, an electric discharge device having an anode, a cathode, and a control electrode; means for impressing an anode potential between said anode and cathode such as to maintain a discharge in said device at the proper potential on said control electrode; a control circuit for said device including in series biasing means for maintaining said device non-conducting in the quiescent state of said combination, means for impressing a first control potential to counteract said biasing means, and means for impressing a second control potential to counteract said first potential when said first potential is impressed substantially at its maximum magnitude; means for actuating said first-potential impressing means; and means for actuating said second-potential impressing means a predetermined time interval after said first-potential impressing means is actuated and while said first-potential impressing means remain actuated and said first potential remains impressed substantially at its maximum magnitude.

2. In combination, an electric discharge device having an anode, a cathode, and a control electrode; means for impressing anode potential between said anode and cathode to maintain said device conducting at the proper potential on said control electrode; biasing means; a first transformer having a secondary winding; a second transformer having a secondary winding; rectifier means; means connecting in series said control electrode, said cathode, said biasing means, said rectifier means, said winding of said first transformer and said winding of said second transformer with said biasing means connected to prevent said device from conducting; means for impressing on said first transformer a first control potential such that the resulting potential on the secondary of said first transformer counteracts said biasing means; and means for impressing on said second transformer a second control potential such that the resulting potential in the secondary of said second transformer counteracts said resulting potenial of said secondary of said first transformer; said rectifier means being poled to block current flow from said secondary of said first transformer to the secondary of said second transformer under the influence of said resulting potential in said secondary of said first transformer and to permit current to flow from said secondary of said second transformer to said secondary of said first transformer under the influence of said resulting potential in the secondary of said second transformer.

3. In combination, an electric discharge device having an anode, a cathode, and a control electrode; means for impressing anode potential between said anode and cathode to maintain said device conducting at the proper potential on said control electrode; biasing means; a first transformer having a secondary winding; a second transformer having a secondary winding; rectifier means; and means connecting in series said control electrode, said cathode, said biasing means, said rectifier means, said winding of said first transformer and said winding of said second transformer with said biasing means connected to prevent said device from conducting and said rectifier means permitting conduction of current of one polarity.

4. In combination, a first conductor for supplying alternating current; a second conductor for supplying alternating current; a third conductor for supplying alternating current, said second conductor being maintained at a potential intermediate said first and third conductors; a first electric discharge device having an anode, a cathode, and a control electrode; means connecting said anode to said first conductor; means connecting said cathode to said second conductor; a second electric discharge device having an anode, a cathode, and a control electrode; first rectifier means; a first transformer having a primary and a secondary; means including said first rectifier means and said primary for connecting said anode of said second device to said first conductor, said first rectifier means being poled to conduct positive current from said first conductor to said anode of said second device; means connecting said cathode to said second conductor; a third electric discharge device having an anode, a cathode, and a control electrode; second rectifier means; a second transformer having a primary and a secondary; means including said second rectifier means and said primary of said second transformer connecting said anode to said third conductor; said second rectifier means being poled to conduct positive current from said third conductor to said anode of said third device; means connecting said cathode of said third device to said second conductor; biasing means; third rectifier means; means connecting in series said control electrode and cathode of said third device, said biasing means, said secondary of said first transformer, said secondary of said second transformer, and said third rectifier means, said biasing means being connected to block conduction of said third device, said secondary of said first transformer being connected to impress a first potential to counteract said biasing potential when said second device is conducting, said secondary of said second transformer being connected to impress a second potential to counteract said first potential when said third device is conducting, and said third rectifier means being poled to conduct current produced by said second potential but to block current produced by said first potential; and means for rendering said second and third devices conducting in sequence.

5. In combination, a first conductor for supplying alternating current; a second conductor for supplying alternating current; a third conductor for supplying alternating current, said second conductor being maintained at a potential intermediate said first and third conductors; a first electric discharge device having an anode, a cathode, and a control electrode; means connecting said anode to said first conductor; means connecting said cathode to said second conductor; a second electric discharge device having an anode, a cathode, and a control electrode; a first transformer having a primary and a secondary; means including said primary for connecting said anode of said second device to said first conductor to conduct positive current from said first conductor to said anode of said third device; means connecting said cathode to said second conductor; a third electric discharge device having an anode, a cathode, and a control electrode; a second transformer having a primary and a secondary; means including said primary of said second transformer connecting said anode to said third conductor to conduct positive current from said third conductor to said anode of said second device; means connecting said cathode of said third device to said second conductor; biasing means; means connecting in series said control electrode and cathode of said third device, said biasing means, said secondary of said first transformer, said secondary of said second transformer, said biasing means being connected to block conduction of said device, said secondary of said first transformer being connected to impress a first potential to counteract said biasing potential when said second device is conducting, said secondary of said second transformer being connected to impress a second potential to counteract said first potential when said third device is conducting; and means for rendering said second and third devices conducting in sequence.

6. In combination, a first conductor for supplying alternating current; a second conductor for supplying alternating current; a third conductor for supplying alternating current; means for maintaining said second conductor at a potential intermediate said first and third conductors; a fourth conductor; a fifth conductor; first rectifier means connecting said first conductor to said fourth conductor and poled to conduct positive current from said first conductor to said fourth conductor; second rectifier means connecting said third conductor to said fifth conductor and poled to conduct positive current from said third conductor to said fifth conductor; a first electric discharge device having an anode, a cathode, and a control electrode; first reactive means connecting said anode to said fourth conductor; means for connecting said cathode to said second conductor; a first time constant network; a first control potential supply; means connecting in series said control electrode, said second conductor, said first network and said first control potential supply means; a first resistor; means for connecting said resistor between said first conductor and said anode; third rectifier means; means for connecting said third rectifier means between said anode and said second conductor poled to conduct positive current from said second conductor to said anode; a second electric discharge device having an anode, a cathode, and a control electrode; second reactive means connecting said anode of said second device to said fifth conductor; means connecting said cathode of said second device to said second conductor; a second time constant network; means including said second network connecting said control electrode of said second device to the junction of said first resistor and said third rectifier means; a second resistor; a fourth rectifier; means connecting said second resistor between said third conductor and said anode of said second device; means connecting said fourth rectifier between said second conductor and said anode of said second device poled to conduct positive current from said second conductor to said anode of said second device; a third electric discharge device having an anode, a cathode, and control electrode means; third reactive means connecting said anode of said third device to said third conductor; means connecting the cathode of said third device to said second conductor; means responsive to the conduction of said second device connected to said control electrode means of said third device for rendering said third device conducting when said second device is conducting; a fourth electric discharge device having an anode, a cathode, and a control electrode; fourth reactive means connecting said anode of said fourth device to said fourth conductor; means for connecting said cathode of said fourth device to said second conductor; a third time constant network; means connecting said network between said control electrode of said fourth device and the junction of said second resistor and said fourth rectifier means; a third resistor connected between said first conductor and said anode of said fourth device; a fifth rectifier means connected between said second conductor and said anode of said fourth device poled to conduct positive current from said second conductor to said anode; means responsive to the conduction of said fourth device and connected to the control electrode of said third device for rendering said third device non-conducting when said fourth device is conducting; a fifth electric discharge device having an anode, a cathode, and a control electrode; means including said control potential supply for connecting said anode of said fifth device to said fifth conductor; means connecting said cathode of said fifth device to said second conductor; said supply being effective to impress a blocking potential on said first network when said fifth device is conducting; a fourth time constant network; and means connecting said fourth network between the control electrode of the fifth device and the junction of the third resistor and the fifth rectifier means.

7. In combination, a first conductor for supplying alternating current; a second conductor for supplying alternating current; a third conductor for supplying alternating current; means for maintaining said second conductor at a potential intermediate said first and third conductors; a fourth conductor; a fifth conductor; first rectifier means connecting said first conductor to said fourth conductor and poled to conduct positive current from said first conductor to said fourth conductor; second rectifier means connecting said third conductor to said fifth conductor and poled to conduct positive current from said third conductor to said fifth conductor; a first electric discharge device having an anode, a cathode, and a control electrode; first reactive means connecting said anode to said fourth conductor; means for connecting said cathode to said second conductor; a first time constant network; a first resistor; means for connecting said resistor between said first conductor and said anode; third rectifier means; means for connecting said third rectifier means between said anode and said second conductor poled to conduct positive current from said second conductor to said anode; a second electric discharge device having an anode, a cathode, and a control electrode; second reactive means connecting said anode of said second device to said fifth conductor; means connecting said cathode of said second device to said second conductor; a second time constant network; means including said second network connecting said control electrode of said second device to the junction of said first resistor and said third rectifier means; a second resistor; a fourth rectifier; means connecting said second resistor between said third conductor and said anode of said second device; means connecting said fourth rectifier between said second conductor and said anode of said second device poled to conduct positive current from said second conductor to said anode of said second device; a third electric discharge device having an anode, a cathode, and control electrode means; third reactive means connecting said anode of said third device to said third conductor; means connecting the cathode of said third device to said second conductor; means responsive to the conduction of said second device connected to said control electrode means of said third device for rendering said third device conducting when said second device is conducting; a fourth electric discharge device having an anode, a cathode, and a control electrode; fourth reactive means connecting said anode of said fourth device to said fourth conductor; means for connecting said cathode of said fourth device to said second conductor; a third time constant network; means connecting said network between said control electrode of said fourth device and the junction of said second resistor and said fourth rectifier means; a third resistor connected between said first conductor and said anode of said fourth device; a fifth rectifier means connected between said second conductor and said anode of said fourth device poled to conduct positive current from said second conductor to said anode; means responsive to the conduction of said fourth device and connected to the control electrode of said third device for rendering said third device non-conducting when said fourth device is conducting; a fifth electric discharge device having an anode, a cathode, and a control electrode; means connecting said cathode of said fifth device to said second conductor; a fourth time constant network; means connecting said fourth network between the control electrode of the fifth device and the junction of the third resistor and the fifth rectifier means; and means responsive to the conductivity of said fifth device and connected in circuit with the anode of the fifth device and said fifth conductor and with the control electrode of the first device and the first network for impressing a blocking potential on said first network when the fifth device is conducting.

8. In a sequence timer in combination, an electric discharge device for starting the operation of said timer; said device having an anode, a cathode, and a control electrode; a first alternating current supply conductor; a second alternating current supply conductor; a third alternating current supply conductor; means for maintaining said second conductor at a potential intermediate said first and third conductors; means including normally open starting switch means for connecting said anode and cathode between said first conductor and said second conductor; said anode being electrically nearest said first conductor and said cathode being electrically nearest said second conductor; reactive means; first rectifier means; means connecting said reactive means and said first rectifier means in series between said third conductor and said second conductor with said reactive means connected to said third conductor and said rectifier means connected to conduct positive current from said third conductor to said second conductor; resistive means; second rectifier means; means connecting said resistive means and said second rectifier means in series between said third conductor and said second conductor with said resistive means connected to said third conductor and said second rectifier means poled to conduct positive current from said second conductor to said third conductor; means connecting the junction of said resistive means and said second rectifier means to said control electrode; and means connecting said last-named junction to the junction of said reactive means and said first rectifier means.

9. In combination, an electric discharge device having an anode, a cathode and a control electrode; means for impressing a first potential between said anode and cathode such as to maintain a discharge in said device at the proper potential on said control electrode; and a control circuit for said device connected to said control electrode and including biasing means for maintaining said device non-conducting in the quiescent state of said combination; means for impressing a second potential to counteract said biasing means and permit said device to conduct in the operating state of the combination; and means responsive to said second potential impressing means and actuable while said second potential is still impressed substantially at its maximum magnitude for impressing a third potential to counteract said second potential and revert said device to a non-conducting condition.

10. In a sequence timer in combination, an electric discharge device for starting the operation of said timer; said device having an anode, a cathode, and a control electrode; a first alternating current supply conductor; a second alternating current supply conductor; a third alternating current supply conductor; means for maintaining said second conductor at a potential intermediate said first and third conductors; means including normally open starting switch means and first rectifier means for connecting said anode and cathode between said first conductor and said second conductor; said anode being electrically nearest said first conductor and said cathode being electrically nearest said second conductor and said first rectifier means being poled to conduct positive current from said first conductor to said second conductor; reactive means; second rectifier means; means including third rectifier means connecting said reactive means and said second rectifier means in series between said third conductor and said second conductor with said reactive means connected to said third conductor and said second rectifier means connected to conduct positive current from said third conductor to said second conductor and said third rectifier means being connected to conduct positive current from said third conductor to said second conductor, resistive means; fourth rectifier means; means connecting said resistive means and said fourth rectifier means in series between said third conductor and said second conductor with said resistive means connected to said third conductor and said fourth rectifier means poled to conduct positive current from said second conductor to said third conductor; means connecting the junction of said resistive means and said fourth rectifier means to said control electrode; and means connecting said last-named junction to the junction of said reactive means and said second rectifier means.

11. In combination, a first conductor for supplying a potential; a second conductor for supplying a potential; an electric discharge device having an anode, a cathode, and a control electrode; blocking bias means, first means to be actuated for counteracting said blocking bias means; a time constant network; means for connecting said anode to said first conductor; means for connecting said cathode to said second conductor; means for connecting in a series circuit said control electrode, said second conductor, said time constant network, said blocking bias means, and said counteracting means; and second means responsive to actuation of said first means for impressing a potential across said network for counteracting the potential supplied by said counteracting means while said last-named potential remains impressed substantially at its maximum magnitude.

12. In combination, a first conductor; a second conductor; an electric discharge device having an anode, a cathode, and a control electrode; biasing means; a time constant network; a first transformer having a primary and a secondary; a second transformer having a primary and a secondary; means connecting said anode to said first conductor; means connecting said cathode to said second conductor; means connecting in series said control electrode, said second conductor, said network, said secondary of said first transformer, and said biasing means; said biasing means having a polarity and a magnitude such as to maintain said device non-conducting in the quiescent condition of said combination; means connecting said secondary of said second transformer across said network, means for supplying current to the primary of said first transformer, the potential of said secondary of said first transformer impressing a potential to counteract said biasing means when current is supplied to said last-named primary, and means responsive to the supply of current to said primary of said first transformer for supplying current to the primary of said second transformer, said secondary of said second transformer impressing on said network a potential to counteract the potential of said secondary of said first transformer while said last-named potential remains impressed substantially at its maximum magnitude when current is supplied to the primary of said second transformer.

13. In combination, a first conductor; a second conductor; an electric discharge device having an anode, a cathode, and a control electrode; biasing means; a time constant network; a first transformer having a primary and a secondary; a second transformer having a primary and a secondary; means connecting said anode to said first conductor; means connecting said cathode to said second conductor; means connecting in series said control electrode, said second conductor, said network, said secondary of said first transformer, and said biasing means; said biasing means having a polarity and a magnitude such as to maintain said device non-conducting in the quiescent condition of said combination; means connecting said secondary of said second transformer across said network, means for supplying current to the primary of said first transformer, the potential of said secondary of said first transformer impressing a potential to counteract said biasing means when current is supplied to said last-named primary, and means responsive to the supply of current to said primary of said first transformer for supplying current to the primary of said second transformer, said connecting means for said secondary of said second transformer including rectifier means poled to conduct positive current in a sense such as to charge said network to a potential such as to block said discharge device, and said secondary of said second transformer impressing on said network a potential to counteract the potential of said secondary of said first transformer while said last-named potential remains impressed substantially at its maximum magnitude when current is supplied to the primary of said second transformer.

14. A sequence timer for timing squeeze, weld, hold and off operations of welding apparatus and including means to be actuated for causing welding current to flow in said welding apparatus comprising in combination first, second and third alternating potential conductors, means connected to said conductors for impressing alternating potential in opposite phase between said first and second conductors and said third and second conductors, respectively, fourth and fifth direct current conductors, first rectifier means connecting said fourth conductor to said first conductor to impress direct current potential between said fourth conductor and said second conductor, second rectifier means connecting said fifth conductor to said third conductor to impress direct current potential between said fifth conductor and said second conductor, first, second, third, fourth and fifth electric discharge devices, each device having an anode, a cathode, and a control electrode, means connected to the cathodes of all said devices for connecting said cathodes to said second conductor, means connected to said anodes of said first and third devices for connecting the anodes of said first and third devices to said fourth conductor, means connected to said anodes of said second and fourth devices for connecting said anodes of said second and fourth devices to said fifth conductor, means including said welding current causing means connected to said anode of said fifth device for connecting said last-named anode to said third conductor, selectively actuable means for rendering said first device conducting, means interconnecting said anodes and said control electrodes of said first, second, third and fourth devices for rendering said second, third and fourth devices conducting in succession on the rendering of said first device conducting, whereby on the rendering of said first device conducting said squeeze, weld, hold, and off intervals are timed, and means responsive to the timing out of said squeeze interval for rendering said fifth device conducting.

15. A sequence timer for timing squeeze, weld, hold and off operations of welding apparatus comprising in combination first, second and third alternating potential conductors, means connected to said conductors for impressing alternating potential in opposite phase between said first and second conductors and said third and second conductors, respectively, fourth and fifth direct current conductors, first rectifier means connecting said fourth conductor to said first conductor to impress direct current potential between said fourth conductor and said second conductor, second rectifier means connecting said fifth conductor to said third conductor to impress direct current potential between said fifth conductor and said second conductor, first, second, third and fourth electric discharge devices, each device having an anode, a cathode, and a control electrode, means connected to the cathodes of all said devices for connecting said cathodes to said second conductor, means connected to said anodes of said first and third devices for connecting the anodes of said first and third devices to said fourth conductor, means connected to said anodes of said second and fourth devices for connecting said anodes of said second and fourth devices to said fifth conductor, selectively actuable means for rendering said first device conducting, and means interconnecting said anodes and said control electrodes of said first, second, third and fourth devices for rendering said second, third and fourth devices conducting in succession on the rendering of said first device conducting, whereby on the rendering of said first device conducting said squeeze, weld, hold, and off intervals are timed.

16. In combination, an electric discharge device having an anode, a cathode and a control electrode, means connected to said anode and cathode for impressing an alternating potential between said anode and cathode, biasing means, first means to be actuated for impressing a first control alternating potential, a time constant network including a capacitor shunted by a resistor, means connecting directly in series said control electrode, said cathode, said biasing means, said network and said first means, said biasing means impressing a bias potential to block conduction of said device when said first means is unactuated and said network being charged by current flow between said control electrode and cathode acting as a rectifier, when said first means is actuated, to a second potential counteracting said biasing potential, second means to be actuated for impressing a second control alternating potential, a rectifier, and means connecting directly in series said second means, said rectifier and said network, said network being charged through said rectifier to a third potential counteracting said second potential when said second means is actuated.

References Cited in the file of this patent

UNITED STATES PATENTS

| | | |
|---|---|---|
| 1,938,742 | Demarest | Dec. 12, 1933 |
| 1,946,615 | Demarest | Feb. 13, 1934 |
| 2,098,052 | Lord | Nov. 2, 1937 |